US012548502B2

(12) United States Patent
Park et al.

(10) Patent No.: US 12,548,502 B2
(45) Date of Patent: Feb. 10, 2026

(54) DISPLAY DEVICE AND METHOD OF DRIVING DISPLAY PANEL BY USING THE SAME

(71) Applicant: Samsung Display Co., LTD., Yongin-si (KR)

(72) Inventors: Heesook Park, Suwon-si (KR); Bonggyun Kang, Suwon-si (KR); Kyoungho Lim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/870,206

(22) Filed: Jul. 21, 2022

(65) Prior Publication Data

US 2023/0162667 A1 May 25, 2023

(30) Foreign Application Priority Data

Nov. 19, 2021 (KR) ........................ 10-2021-0160468

(51) Int. Cl.
*G09G 3/3208* (2016.01)

(52) U.S. Cl.
CPC ... *G09G 3/3208* (2013.01); *G09G 2320/0257* (2013.01); *G09G 2320/041* (2013.01); *G09G 2320/043* (2013.01); *G09G 2320/046* (2013.01); *G09G 2320/048* (2013.01); *G09G 2320/0626* (2013.01); *G09G 2320/0673* (2013.01); *G09G 2320/0686* (2013.01)

(58) Field of Classification Search
CPC ......... G09G 3/3208; G09G 2320/0233; G09G 2320/04; G09G 2320/043; G09G 2320/046; G09G 2320/048; G09G 2320/062; G09G 2320/0686; G09G 2320/0257; G09G 2320/041; G09G 2320/0626; G09G 2320/0673
See application file for complete search history.

(56) References Cited

U.S. PATENT DOCUMENTS 9,390,679 B2 * 7/2016 Harada .................... G09G 5/04
9,613,563 B2 * 4/2017 Seong ...................... G09G 3/22
10,097,886 B2 * 10/2018 Owaki ..................... H04N 5/20
(Continued)

FOREIGN PATENT DOCUMENTS

KR 1020100002110 A 1/2010
KR 1020150041967 A 4/2015
(Continued)

*Primary Examiner* — Michael J Jansen, II
(74) *Attorney, Agent, or Firm* — CANTOR COLBURN LLP

(57) ABSTRACT

A display device includes: a display panel, which displays an image; a driving controller, which determines a gain reduction region based on input image data input to the display panel, and generates a data signal by correcting the input image data by applying a gain to the input image data to correspond to the gain reduction region; and a data driver, which converts the data signal into a data voltage to output the data voltage to the display panel. The driving controller is configured to generate first, second, and third data signals by correcting first, second, and third input image data input to first, second, and third regions of the display panel by applying first, second, and third gain values to the first, second, and third input image data, respectively.

6 Claims, 14 Drawing Sheets

(56) References Cited

U.S. PATENT DOCUMENTS

| | | | | |
|---|---|---|---|---|
| 10,621,710 | B2 * | 4/2020 | Gim | G06T 5/009 |
| 10,714,049 | B2 * | 7/2020 | Cho | G09G 5/10 |
| 11,164,540 | B2 * | 11/2021 | Holland | G09G 3/3208 |
| 11,217,164 | B2 * | 1/2022 | Kim | G09G 3/3225 |
| 11,699,413 | B2 * | 7/2023 | Lee | G09G 3/20 345/204 |
| 2014/0267471 | A1 * | 9/2014 | Harada | G09G 5/04 345/694 |
| 2015/0103108 | A1 * | 4/2015 | Seong | G09G 3/3208 345/694 |
| 2017/0372675 | A1 * | 12/2017 | Cho | G09G 5/363 |
| 2018/0041801 | A1 * | 2/2018 | Owaki | H04N 19/136 |
| 2018/0151117 | A1 | 5/2018 | Choi et al. | |
| 2019/0057493 | A1 * | 2/2019 | Gim | G09G 5/10 |
| 2019/0180670 | A1 * | 6/2019 | Abe | G09G 3/2081 |
| 2020/0372860 | A1 * | 11/2020 | Kim | H04N 5/57 |
| 2021/0183333 | A1 * | 6/2021 | Holland | G09G 3/3208 |
| 2022/0114986 | A1 * | 4/2022 | Lee | G09G 5/10 |
| 2023/0162667 | A1 * | 5/2023 | Park | G09G 3/3208 365/189.05 |

FOREIGN PATENT DOCUMENTS

| | | | |
|---|---|---|---|
| KR | 1020180061450 | A | 6/2018 |
| KR | 20210084767 | A | 7/2021 |
| KR | 20210121325 | A | 10/2021 |

* cited by examiner

DISPLAY DEVICE AND METHOD OF DRIVING DISPLAY PANEL BY USING THE SAME

This application claims priority to Korean Patent Application No. 10-2021-0160468, filed on Nov. 19, 2021, and all the benefits accruing therefrom under 35 U.S.C. § 119, the content of which in its entirety is herein incorporated by reference.

BACKGROUND

1. Field

The present disclosure relates to a display device and a method of driving a display panel by using the same, and more particularly, to a display device and a method of driving a display panel by using the same, capable of variably adjusting a load (or input image data) of an edge region of the display panel according to a difference in a load corresponding to an image displayed on the display panel and/or a load corresponding to a motion value input in each of previous and subsequent frames.

2. Description of the Related Art

In general, a display device may include a display panel and a display panel driver. The display panel may display an image based on an input image, and may include a plurality of gate lines, a plurality of data lines, and a plurality of pixels. The display panel driver may include a gate driver configured to provide gate signals to the gate lines, a data driver configured to provide data voltages to the data lines, and a driving controller configured to control the gate driver and the data driver.

In many cases, a logo of an image producer, a logo of a broadcaster, or the like may be displayed in an edge region of the display panel, and the logo may be continuously displayed so that an afterimage caused by the logo may remain in the edge region.

SUMMARY

Accordingly, the technical aspect of the present disclosure has been made to solve the problems of the related art described above, and one aspect of the present disclosure is to provide a display device capable of variably adjusting a load of an edge region of a display panel according to a difference in a load of the display panel and/or a load corresponding to a motion value input to an image in each of previous and subsequent frames.

Another aspect of the present disclosure is to provide a method of driving a display panel by using the display device.

However, aspects of the present disclosure are not limited to the above-described aspects, and may be variously expanded without departing from the idea and scope of the present disclosure.

To implement one aspect of the present disclosure, according to on embodiment, a display device includes: a display panel, which displays an image; a driving controller, which determines a gain reduction region based on input image data input to the display panel, and generates a data signal by correcting the input image data by applying a gain to at least part of the input image data corresponding to the gain reduction region; and a data driver, which converts the data signal into a data voltage to output the data voltage to the display panel. The data signal includes a first data signal, a second data signal, and a third data signal, the driving controller is configured to: generate the first data signal by correcting first input image data input to a first region of the display panel by applying a first gain value to the first input image data; generate the second data signal by correcting second input image data input to a second region of the display panel by applying a second gain value that is lower than the first gain value to the second input image data; and generate the third data signal by correcting third input image data input to a third region of the display panel by applying a third gain value that is lower than the second gain value to the third input image data. The input image data includes the first input image data, the second input image data, and the third input image data According to one embodiment, the first region may correspond to a central region of the display panel, the third region may correspond to an outer peripheral region of the display panel, and the second region may correspond to a region between the first region and the third region.

According to one embodiment, the driving controller may be configured to generate the data signal by correcting the input image data by applying the gain to the at least part of the input image data based on a sum of the at least part of the input image data only when a size of the sum of the at least part of the input image data is greater than or equal to a threshold that is a preset size.

According to one embodiment, the driving controller may be configured not to apply the gain when the size of the sum of the at least part of the input image data is less than the threshold.

According to one embodiment, the driving controller may be configured to correct the input image data by applying the gain based on a temperature of the display panel.

According to one embodiment, the driving controller may be configured to: divide the display panel into n blocks (where n is a natural number that is greater than or equal to 2); and correct the input image data by applying the gain based on a part of the input image data input corresponding to m blocks (where m is a natural number that is less than n) selected among the n blocks.

According to one embodiment, the m blocks may be first to m-th blocks selected among the n blocks in an ascending order of a size of the input image data for each block or a representative value of the input image data for each block.

According to one embodiment, the driving controller may be configured not to apply the gain when the size of the input image data of the m blocks is greater than a threshold.

According to one embodiment, the m blocks may be first to m-th blocks selected among the n blocks in a descending order of a size of the input image data for each block or a representative value of the input image data for each block.

According to one embodiment, the n blocks may correspond to n columns, and the m blocks may be selected from blocks corresponding to even-numbered columns or odd-numbered columns among the n columns.

To implement one aspect of the present disclosure, according to on embodiment, a display device includes: a display panel, which displays an image; a driving controller, which determines a gain reduction region based on $(N-1)^{th}$ input image data (where N is a natural number that is greater than or equal to 2) input in an $(N-1)^{th}$ frame of the image displayed on the display panel and $N^{th}$ input image data input in an $N^{th}$ frame of the image displayed on the display panel, and generates a data signal by correcting the $N^{th}$ input image data by applying a gain to at least part of the $N^{th}$ input image data input in the $N^{th}$ frame corresponding to the gain reduction region; and a data driver, which converts the data signal into a data voltage to output the data voltage to the display panel. The data signal includes a first data signal, a second data signal, and a third data signal, the driving controller is configured to: generate the first data signal by correcting first partial input image data input to a first region of the display panel in the $N^{th}$ frame by applying a first gain value to the first partial input image data; generate the second data signal by correcting second partial input image data input to a second region of the display panel in the $N^{th}$ frame by applying a second gain value that is lower than the first gain value to the second partial input image data; and generate the third data signal by correcting third partial input image data input to a third region of the display panel in the $N^{th}$ frame by applying a third gain value that is lower than the second gain value to the third partial input image data. The $N^{th}$ input image data includes the first partial input image data, the second partial input image data, and the third partial input image data.

According to one embodiment, the first region may correspond to a central region of the display panel, the third region may correspond to an outer peripheral region of the display panel, and the second region may correspond to a region between the first region and the third region.

According to one embodiment, the driving controller may be, which correct the input image data by applying the gain only when a difference between a size of input image data input to one region in the $(N-1)^{th}$ frame and a size of input image data input to the one region in the $N^{th}$ frame is greater than or equal to a preset size.

According to one embodiment, the driving controller may be, which generate the data signal by correcting the input image data based on a sum of the at least part of the input image data only when a size of the sum of the at least part of the input image data is greater than or equal to a threshold that is a preset size.

According to one embodiment, the driving controller may be configured not to apply the gain when the size of the sum of the at least part of the input image data is less than the threshold.

To implement another aspect of the present disclosure, according to on embodiment, a method of driving a display panel includes: calculating input image data input to a display panel; determining a gain reduction region based on the input image data; generating a data signal by correcting the input image data by applying a gain to at least part of the input image data corresponding to the gain reduction region; and converting the data signal into a data voltage to output the data voltage to the display panel. The data signal includes a first data signal, a second data signal, and a third data signal. The first data signal is generated by correcting first input image data input to a first region of the display panel by applying a first gain value to the first input image data, the second data signal is generated by correcting second input image data input to a second region of the display panel by applying a second gain value that is lower than the first gain value to the second input image data, and the third data signal is generated by correcting third input image data input to a third region of the display panel by applying a third gain value that is lower than the second gain value to the third input image data. The input image data includes the first input image data, the second input image data, and the third input image data.

According to one embodiment, the first region may correspond to a central region of the display panel, the third region may correspond to an outer peripheral region of the display panel, and the second region may correspond to a region between the first region and the third region.

According to one embodiment, the data signal may be generated by correcting the input image data based on a sum of the input image data only when a size of the sum of the at least part of the input image data is greater than or equal to a threshold that is a preset size.

According to one embodiment, the gain may not be applied when the size of the sum of the at least part of the input image data or the representative value of the input image data of the m blocks is less than the threshold.

According to one embodiment, the input image data may be corrected by applying the gain based on a temperature of the display panel.

According to one embodiment, the display panel may be divided into n blocks (where n is a natural number that is greater than or equal to 2), and the input image data may be corrected by applying the gain based on a part of the input image data input corresponding to m blocks (where m is a natural number that is less than n) selected among the n blocks.

According to one embodiment, the m blocks may be first to m-th blocks selected among the n blocks in an ascending order of a size of the input image data for each block or a representative value of the input image data for each block.

According to one embodiment, the gain may not be applied when the size of the input image data of the m blocks or the representative value of the input image data of the m blocks is greater than a threshold.

According to one embodiment, the m blocks may be first to m-th blocks selected among the n blocks in a descending order of a size of the input image data for each block or a representative value of the input image data for each block.

According to one embodiment, the n blocks may correspond to n columns, and the m blocks may be selected from blocks corresponding to even-numbered columns or odd-numbered columns among the n columns.

According to one embodiment, the gain reduction region may be determined based on a difference between a size of $(K-1)^{th}$ input image data (where K is a natural number that is greater than or equal to 2) of an $(K-1)^{th}$ frame of an image displayed on the display panel and a size of $K^{th}$ input image data of an $K^{th}$ frame of the image displayed on the display panel, and a $K^{th}$ data signal may be generated by correcting the $K^{th}$ input image data by applying the gain to the $K^{th}$ input image data input in at least part of the $K^{th}$ frame corresponding to the gain reduction region.

To implement one aspect of the present disclosure, according to on embodiment, a display device includes: a display panel, which displays an image; a driving controller, which determines a gain reduction region based on a load of the display panel, and generates a data signal by correcting input image data by applying a gain to at least part of the input image data corresponding to the gain reduction region; and a data driver, which converts the data signal into a data voltage to output the data voltage to the display panel. The data signal includes a first data signal, a second data signal, and a third data signal. The driving controller is configured to: generate the first data signal by correcting first input image data input to a first region of the display panel by applying a first gain value to the first input image data; generate the second data signal by correcting second input image data input to a second region of the display panel by applying a second gain value that is lower than the first gain value to the second input image data; and generate the third data signal by correcting third input image data input to a third region of the display panel by applying a third gain value that is lower than the second gain value to the third input image data. The input image data includes the first input image data, the second input image data, and the third input image data.

To implement one aspect of the present disclosure, according to on embodiment, a display device includes: a display panel, which displays an image; a driving controller, which determines a gain reduction region based on a difference between a first load in an $(N-1)^{th}$ frame (where N is a natural number that is greater than or equal to 2) of the image displayed on the display panel and a second load in an $N^{th}$ frame of the image displayed on the display panel, and generates a data signal by correcting $N^{th}$ input image data by applying a gain to the $N^{th}$ input image data input in at least part of the $N^{th}$ frame corresponding to the gain reduction region; and a data driver, which converts the data signal into a data voltage to output the data voltage to the display panel. The data signal includes a first data signal, a second data signal, and a third data signal. The driving controller is configured to: generate the first data signal by correcting first partial input image data input to a first region of the display panel in the $N^{th}$ frame by applying a first gain value to the first partial input image data; generate the second data signal by correcting second partial input image data input to a second region of the display panel in the $N^{th}$ frame by applying a second gain value that is lower than the first gain value to the second partial input image data; and generate the third data signal by correcting third partial input image data input to a third region of the display panel in the $N^{th}$ frame by applying a third gain value that is lower than the second gain value to the third partial input image data. The $N^{th}$ input image data includes the first partial input image data, the second partial input image data, and the third partial input image data.

According to embodiments of the present disclosure, the display device may include: a display panel configured to display an image; a driving controller configured to determine a gain reduction region based on input image data input to the display panel, and generate a data signal by correcting the input image data by applying a gain to the input image data to correspond to the gain reduction region; and a data driver configured to convert the data signal into a data voltage to output the data voltage to the display panel, wherein the driving controller is configured to: generate a first data signal by correcting first input image data input to a first region of the display panel by applying a first gain value to the first input image data; generate a second data signal by correcting second input image data input to a second region of the display panel by applying a second gain value that is lower than the first gain value to the second input image data; and generate a third data signal by correcting third input image data input to a third region of the display panel by applying a third gain value that is lower than the second gain value to the third input image data.

As described above, since the gain is applied, a display defect in which an afterimage remains in the outer peripheral region of the display panel can be prevented.

However, effects of the present disclosure are not limited to the above-described effects, and may be variously expanded without departing from the idea and scope of the present disclosure.

DETAILED DESCRIPTION

Figure 1:
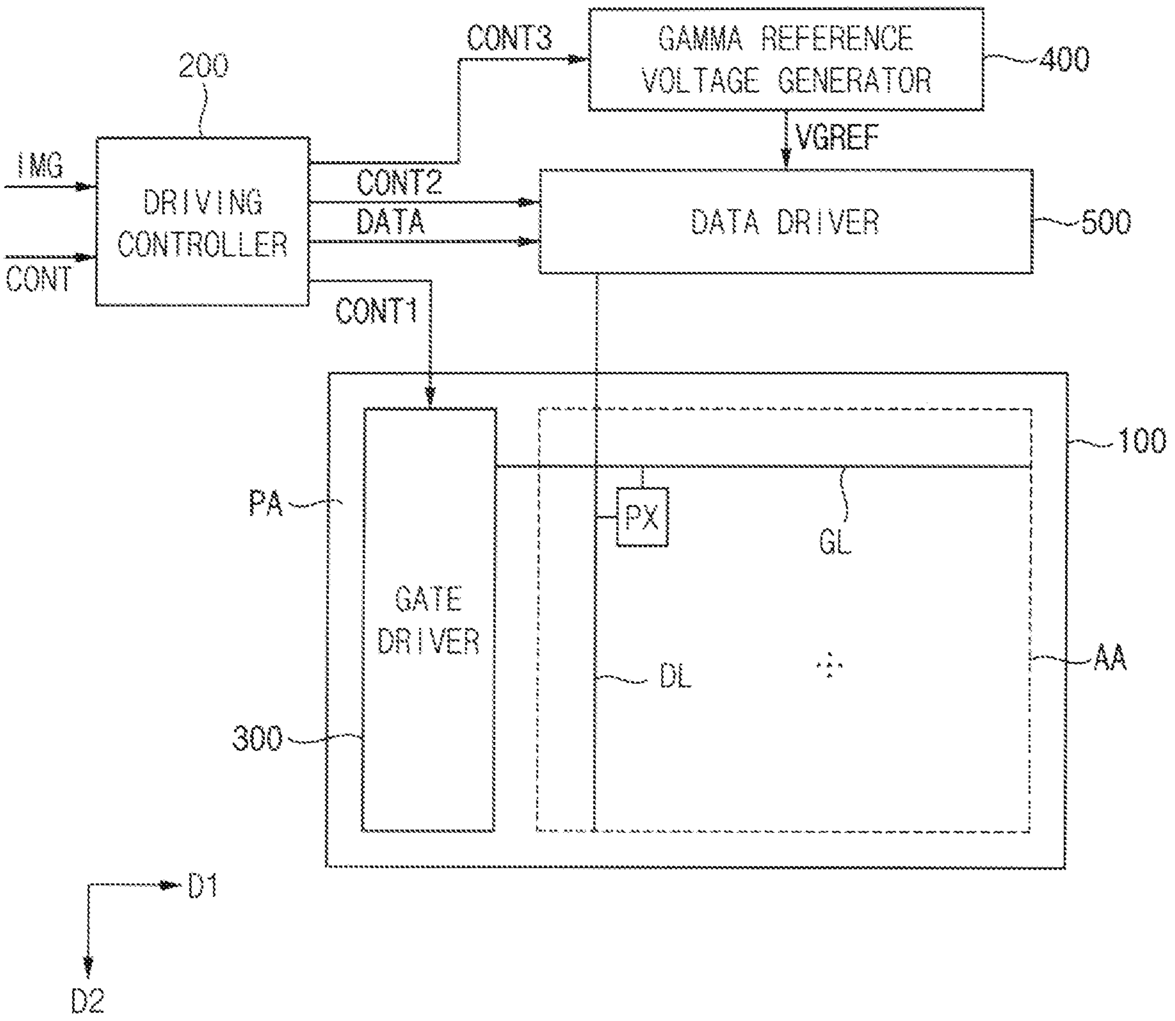
FIG. 1 is a block diagram showing a display device according to one embodiment of the present disclosure.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, embodiments of the present disclosure will be described in more detail with reference to the accompanying drawings. The same or similar reference numerals will be used for the same elements in the accompanying drawings.

FIG. 1 is a block diagram showing a display device according to one embodiment of the present disclosure.

Referring to FIG. 1, a display device may include a display panel 100 and a display panel driver. The display panel driver may include a driving controller 200, a gate driver 300, a gamma reference voltage generator 400, and a data driver 500.

In an embodiment, for example, the driving controller 200 and the data driver 500 may be integrally formed. For example, the driving controller 200, the gamma reference voltage generator 400, and the data driver 500 may be integrally formed. A driving module in which at least the driving controller 200 and the data driver 500 are integrally formed may be referred to as a timing controller-embedded data driver ("TED").

The display panel 100 may include a display part for displaying an image, and a peripheral part that is adjacent to the display part.

The display panel 100 may include a plurality of gate lines GL, a plurality of data lines DL, and a plurality of pixels electrically connected to the gate lines GL and the data lines DL, respectively. The gate lines GL may extend in a first direction D1, and the data lines DL may extend in a second direction D2 intersecting the first direction D1.

The driving controller 200 may receive input image data IMG and an input control signal CONT from an external device (not shown). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT to output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT to output the generated third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL. For example, the gate driver 300 may be mounted on the peripheral part of the display panel. For example, the gate driver 300 may be integrated on the peripheral part of the display panel.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

According to one embodiment of the present disclosure, the gamma reference voltage generator 400 may be disposed in the driving controller 200 or the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into an analog data voltage by using the gamma reference voltage VGREF. The data driver 500 may output the data voltage to the data line DL.

Figure 2:
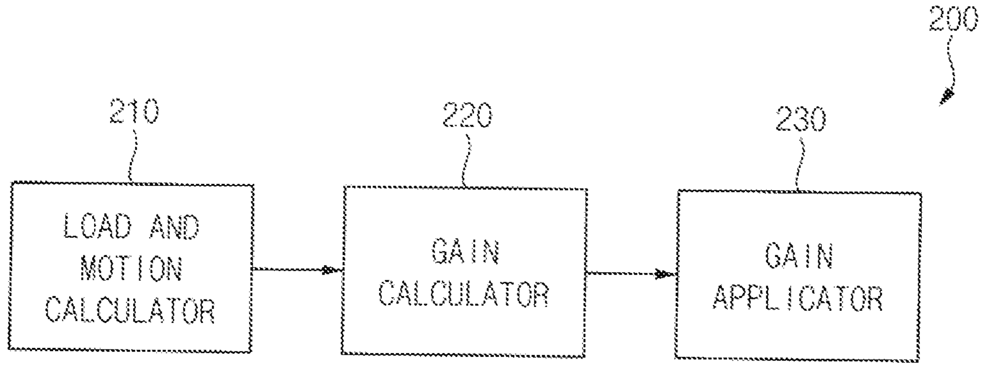
FIG. 2 is a block diagram showing one embodiment of a driving controller included in the display device of FIG. 1.

FIG. 2 is a block diagram showing one embodiment of a driving controller included in the display device of FIG. 1.

Referring to FIGS. 1 and 2, the driving controller 200 may include a load-and-motion calculator 210, a gain calculator 220, and a gain applicator 230. The load-and-motion calculator 210 may calculate a load and a motion of the image displayed on the display panel 100. The load may be defined as a sum of input image data input in a specific frame. For example, the sum of the input image data input in the specific frame may represent the load. According to another example, a value obtained by dividing the sum of the input image data input in the specific frame by a sum of maximum values of input image data that may be input in the specific frame may represent the load. In this case, the load may have a value of 0 to 1. The load may be determined for the input image displayed on an entire region of the display panel 100, or may be determined for the input image displayed on at least a partial region of the display panel 100.

When the load of the image displayed on the display panel 100 is large, the image may have a high luminance. Therefore, when the load-and-motion calculator 210 calculates the load of the image displayed on the display panel 100, the calculation may be understood as calculation of a luminance of the image.

The driving controller 200 may determine a gain reduction region based on the input image data input to the display panel 100. The driving controller 200 may correct the input image data by applying a gain to part of the input image data corresponding to the gain reduction region. The luminance and the load of the image displayed on the display panel 100 may be set based on the input image data.

The driving controller 200 may apply the gain (that will be described below) to reduce a load of the display panel 100 only when a motion in the image displayed on the display panel 100 is large. The motion may be determined based on an absolute value of a difference between loads input to regions having a large load variation in an $(N-1)^{th}$ frame and an $N^{th}$ frame (where N is a natural number that is greater than or equal to 2). When the motion of the image displayed on the display panel 100 is large (e.g., when a movement of a character displayed on the display panel 100 is large, when a movement of an object (a vehicle, etc.) displayed on the display panel 100 is large, etc.), a load difference may be large for each region of images displayed in the $N^{th}$ frame and the $(N-1)^{th}$ frame among images displayed on the display panel 100. In other words, when the motion is large, a load deviation may be large between the $(N-1)^{th}$ frame and the $N^{th}$ frame.

In a case where the motion is large, even when a load of an outer peripheral region of the display panel 100 is reduced by applying the gain, a difference (darkening of the outer peripheral region) that occurs as the gain is applied may not be visually recognized.

In some embodiments, the driving controller 200 may determine the gain reduction region based on $(N-1)^{th}$ input image data input in the $(N-1)^{th}$ frame and $N^{th}$ input image data input in the $N^{th}$ frame. The driving controller 200 may generate the data signal by correcting the $N^{th}$ input image data by applying the gain to part of the $N^{th}$ input image data input in the $N^{th}$ frame corresponding to the gain reduction region.

A preset value may be set based on an average load variation between the $N^{th}$ frame and the $(N-1)^{th}$ frame. For example, the driving controller 200 may apply the gain when a difference between sums of the loads is greater than the average load variation.

In some embodiments, the driving controller 200 may apply the gain only when a difference between a sum of a first load corresponding to at least one region in the $(N-1)^{th}$ frame and a sum of a second load corresponding to the at least one region in the $N^{th}$ frame is greater than or equal to a preset value. Although the embodiments have been described above based on the load, the driving controller 200 may determine whether to apply the gain based on the input image data. This will also be applied to the embodiments set forth below.

In an embodiment, for example, the driving controller 200 may compare a sum of a load corresponding to a central region of the display panel 100 in the $(N-1)^{th}$ frame with a sum of a load corresponding to the central region of the display panel 100 in the $N^{th}$ frame. Thereafter, when a difference between the sums of the loads is greater than or equal to a preset value, the gain may be applied.

The preset value may be set as a value obtained by multiplying a maximum load of the display panel 100 by a predetermined ratio.

The preset size may be set in relation to a minimum load of the display panel 100. The minimum load may be defined as a value at which a contour (e.g., logo) is not visually recognized even when the gain is applied.

Alternatively, the driving controller 200 may determine whether to apply the gain by comparing a sum of a load corresponding to the outer peripheral region of the display panel 100 in the $(N-1)^{th}$ frame with a sum of a load corresponding to the outer peripheral region of the display panel 100 in the $N^{th}$ frame.

The gain calculator 220 may calculate a gain to be applied to the display panel 100 based on the load and/or the motion. The gain will be described in detail with reference to the drawings that will be described below. In addition, the gain applicator 230 may apply the gain calculated by the gain calculator 220 to the display panel 100.

In some embodiments, the gain calculator 220 may calculate the gain to be applied to the display panel 100 based on various factors. For example, the gain calculator 220 may calculate the gain to be applied to the display panel 100 based only on the load. For another example, the gain calculator 220 may calculate the gain to be applied to the display panel 100 based only on a difference in a load corresponding to a variation in a motion value between input data in previous and subsequent frames. Alternatively, for example, the gain calculator 220 may calculate the gain to be applied to the display panel 100 in consideration of both a load in a specific frame and the difference in the load corresponding to the variation in the motion value according to the input data in the previous and subsequent frames.

Figure 3:
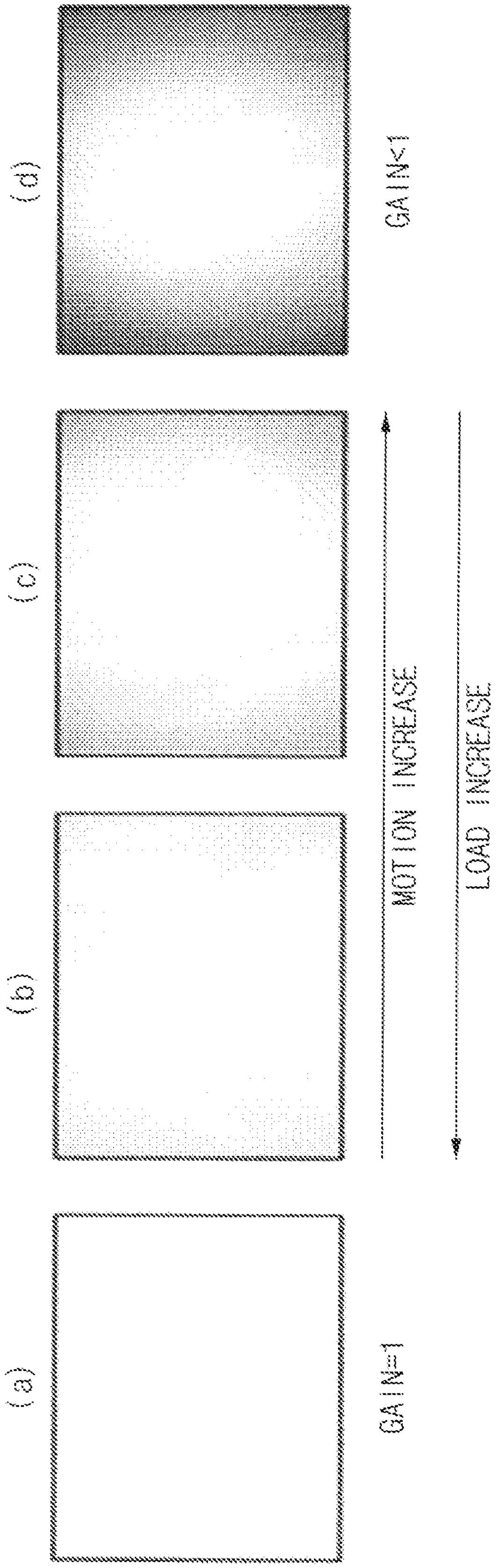
FIGS. 3 and 4 are views for describing a gain applied to the display device of FIG. 1.
Figure 4:
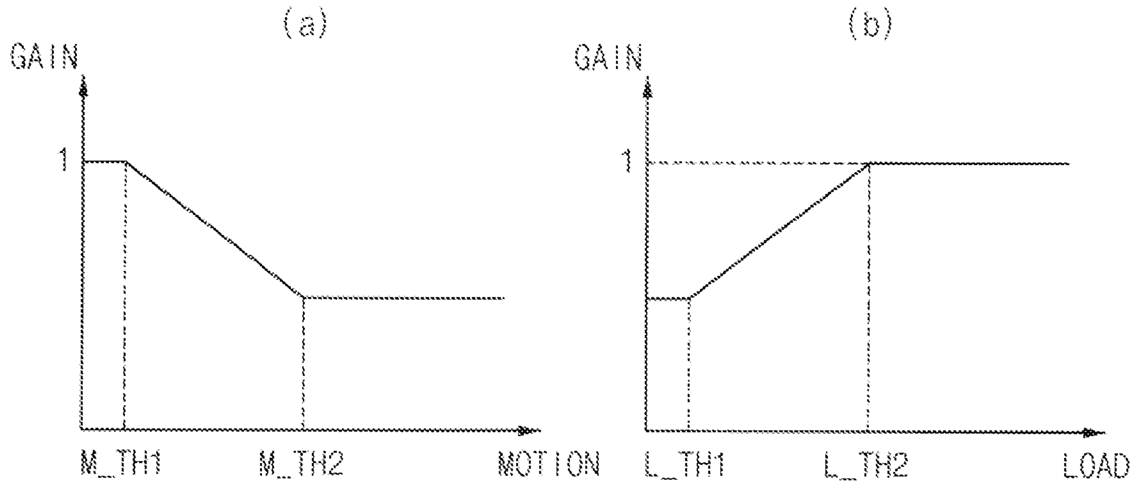

FIGS. 3 and 4 are views for describing a gain applied to the display device of FIG. 1. In FIG. 3, (a), (b), (c), and (d) may correspond to the display panel 100 to which gains are applied, respectively.

Referring to FIGS. 1, 3, and 4, the gain may have a value of 0 to 1, and may have a different value according to a region. The gain may have a maximum gain value in a region corresponding to a center of the display panel 100, and may be decreased as a region becomes away from the region corresponding to the center. In this case, the gain may converge to a minimum gain value in a region corresponding to the outer peripheral region of the display panel 100. The gain may be defined as a value applied to the display panel 100 in order to prevent an afterimage caused by an image or text (e.g., a logo, etc.) that is fixedly and visually recognized in the outer peripheral region (e.g., a corner portion, etc.) of the display panel 100. The outer peripheral region of the display panel 100 may be darkened by applying the gain in order to prevent the afterimage, so that the afterimage may be less visually recognized as compared with the related art.

When the load input to the display panel 100 is large, a screen may be bright. For example, when the load input to the display panel 100 is large, the load of the display panel 100 may be high. In this case, when the gain is applied, darkening of an outer peripheral region of the image displayed on the display panel 100 may be visually recognized. Therefore, the gain may be set as 1 as shown in (b) of FIG. 3. For example, when a test pattern is displayed on the display panel 100, the display panel 100 may have a load that is greater than or equal to a predetermined value. For example, the display panel 100 may display a white color as the test pattern. At this point, the load input to the display panel 100 may be a maximum. In this case, it may be desirable not to apply the gain to the display panel 100. Therefore, when the load input to the display panel 100 is greater than or equal to a preset value, the driving controller 200 may not apply the gain.

In a case where the load input to the display panel 100 is small, when the gain is applied, the darkening of the outer peripheral region in the image displayed on the display panel 100 may be visually recognized relatively less than the above case (a case where the load is large). Therefore, in the case where the load input to the display panel 100 is small, it may be desirable to apply the gain. In the case where the load input to the display panel 100 is small, the load of the display panel 100 may be low.

In a case where the motion of the image displayed on the display panel 100 is large, attention may be focused on the motion. In this case, even when the gain is applied, the darkening of the outer peripheral region may not be visually recognized. In a case where the motion of the image displayed on the display panel 100 is small, when the gain is applied, the darkening of the outer peripheral region may be visually recognized relatively more than in the above case.

The driving controller 200 may apply the gain to the display panel 100 only when a difference between a value of a load corresponding to a motion value according to input image data in the $(N-1)^{th}$ frame and a value of a load corresponding to a motion value according to input image data of the $N^{th}$ frame is greater than or equal to a preset value. At this point, the driving controller 200 may apply the gain in consideration of an overall load input to the display panel 100. In this case, N may be a number that is greater than or equal to 2.

As described above, the gain may be differently set so as to be applied to the display panel 100 according to the load input to the display panel 100 and/or the motion of the image displayed on the display panel 100.

In FIG. 4, (a) is a graph showing a minimum gain value applied to an outermost peripheral portion of the outer peripheral region of the display panel 100 according to a difference between loads input to correspond to motions in the $N^{th}$ frame and the $(N-1)^{th}$ frame, respectively. When the frame changes, in a case where a difference between loads input corresponding to motion values according to input image data in the previous and subsequent frames has a value that is less than or equal to a first motion threshold M_TH1, the minimum gain value may be set as 1. In this case, even when the gain is applied, the load of the display panel 100 may not be changed. Therefore, the gain value of 1 may be defined as an off-gain value in which the load of the display panel 100 may not be changed even if the gain is applied. In a case where the difference between the loads input corresponding to the previous and subsequent frames has a value between the first motion threshold M_TH1 and a second motion threshold M_TH2, a minimum gain may be gradually decreased from 1. In a case where the difference between the loads has a value that is greater than or equal to the second motion threshold M_TH2, the minimum gain may converge to a predetermined value.

Motion threshold values may be set based on a difference between a sum of a load of an entire region (or one region) input corresponding to the $(N-1)^{th}$ frame and a sum of a load of an entire region (or one region) input corresponding to the $N^{th}$ frame. For example, the motion threshold values may be set as a predetermined ratio with respect to a sum of a maximum load of the entire region (or one region) of the display panel 100.

A motion that is a difference in a sum of loads input corresponding to images in the previous and subsequent frames may be defined as a difference between a sum of a load of input image data displayed on the display panel 100 in the $(N-1)^{th}$ frame and a sum of a load of input image data displayed on the display panel 100 in the $N^{th}$ frame.

When the minimum gain value becomes excessively low, a load difference between the central region and the outer peripheral region of the display panel 100 may be increased, so that the minimum gain value may desirably converge to a predetermined value. For example, a minimum value of the minimum gain value may be 0.7.

Although a maximum value of the minimum gain value has been described as being 1, since the above configuration has been provided for illustrative purposes, the embodiments are not limited thereto. In another embodiment, for example, the maximum value of the minimum gain value may be less than 1. A case where the minimum gain value is 1 may be construed as a case where the gain is not applied.

Although the minimum gain value has been shown as having a predetermined slope according to a section, since the above configuration has been provided for illustrative purposes, the embodiments are not limited thereto. For example, the minimum gain may be changed in a curved shape according to a section.

In FIG. 4, (b) is a graph showing a minimum gain value applied to the outer peripheral region of the display panel 100 according to a load. In a case where the load has a value that is less than or equal to a first load threshold L_TH1, the minimum gain value may converge to a predetermined value. In a case where the load has a value between the first load threshold L_TH1 and a second load threshold L_TH2, the minimum gain value may be increased from the predetermined value to 1. In a case where the load has a value that is greater than or equal to the second load threshold L_TH2, the minimum gain value may be set as 1.

Load threshold values may be set by various criteria. For example, the load threshold values may be set as a predetermined ratio with respect to a maximum load input to the display panel 100. According to one example, the predetermined ratio may be defined as an offset with respect to a maximum gray level of the display panel 100.

Alternatively, the load threshold values may be set based on a region of the display panel 100 that has a greatest load. For example, when the display panel 100 is divided into 16 regions, due to one region having a greatest load, the darkening of the outer peripheral region of the display panel 100 may not be visually recognized even when the gain is applied. Therefore, the load threshold values may be set by applying the above schemes based on the one region.

When the minimum gain value becomes excessively low, the load difference between the central region and the outer peripheral region of the display panel 100 may be increased, so that the minimum gain value may desirably converge to a predetermined value. For example, a minimum value of the minimum gain may be about 0.6.

Although a maximum value of the minimum gain has been described as being 1, since the above configuration has been provided for illustrative purposes, the embodiments are not limited thereto. For example, the maximum value of the minimum gain value may be less than 1. The case where the minimum gain value is 1 may be construed as the case where the gain is not applied.

Although the minimum gain value has been shown as having a predetermined slope according to a section, since the above configuration has been provided for illustrative purposes, the embodiments are not limited thereto. For example, the minimum gain value may be changed in a curved shape according to a section.

Figure 5:
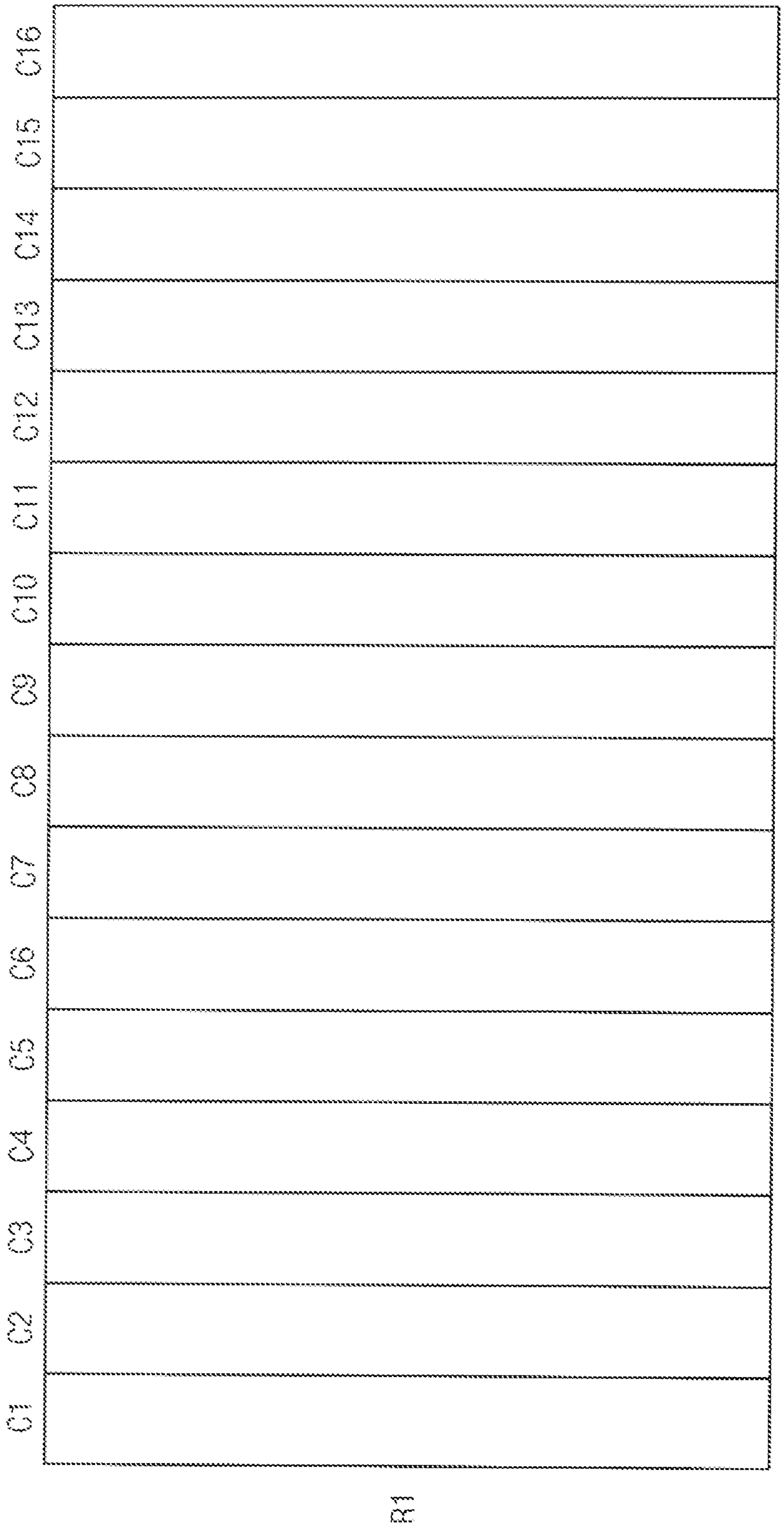
FIGS. 5 to 7 are views showing embodiments in which a display panel included in the display device of FIG. 1 is divided.
Figure 6:
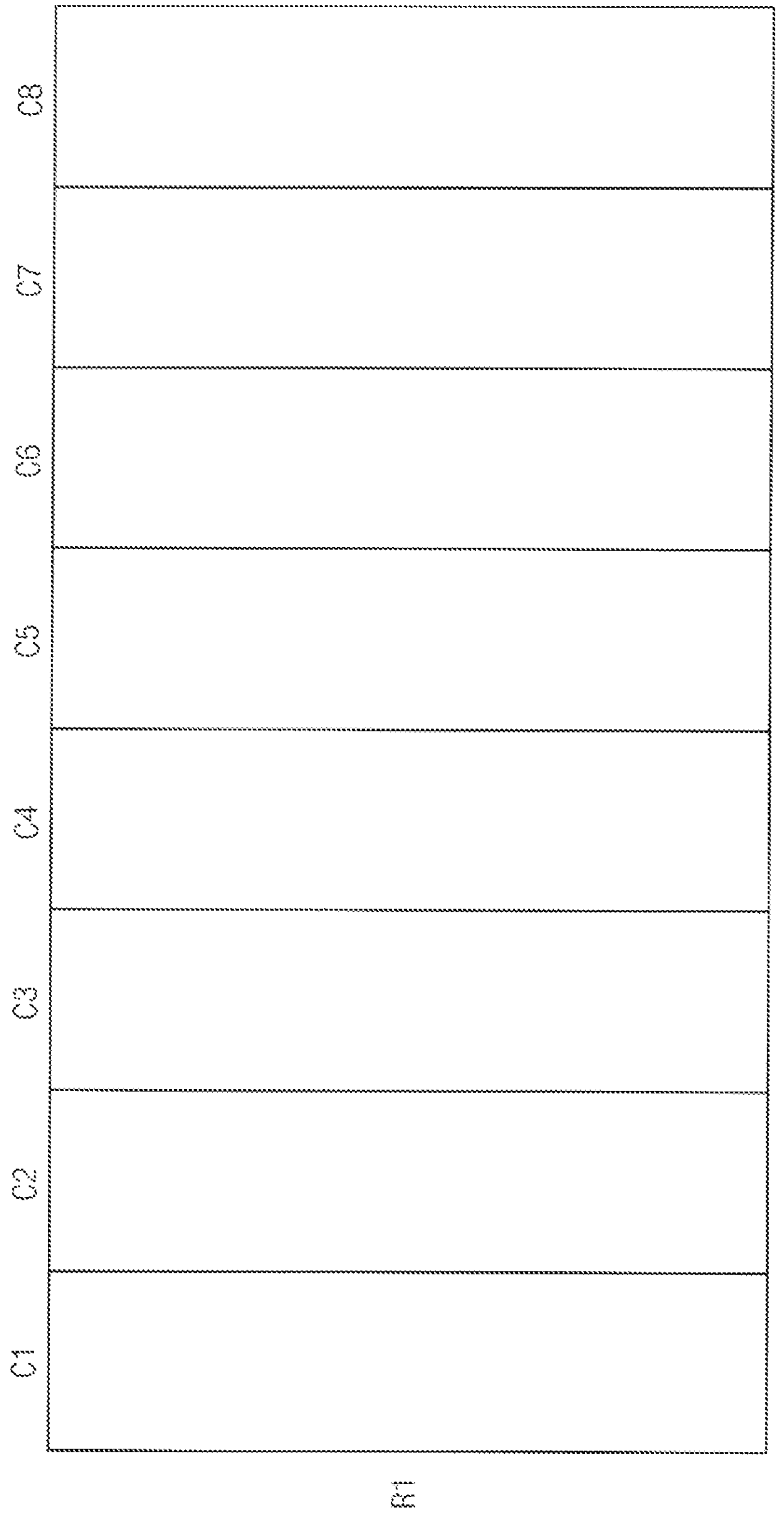
Figure 7:
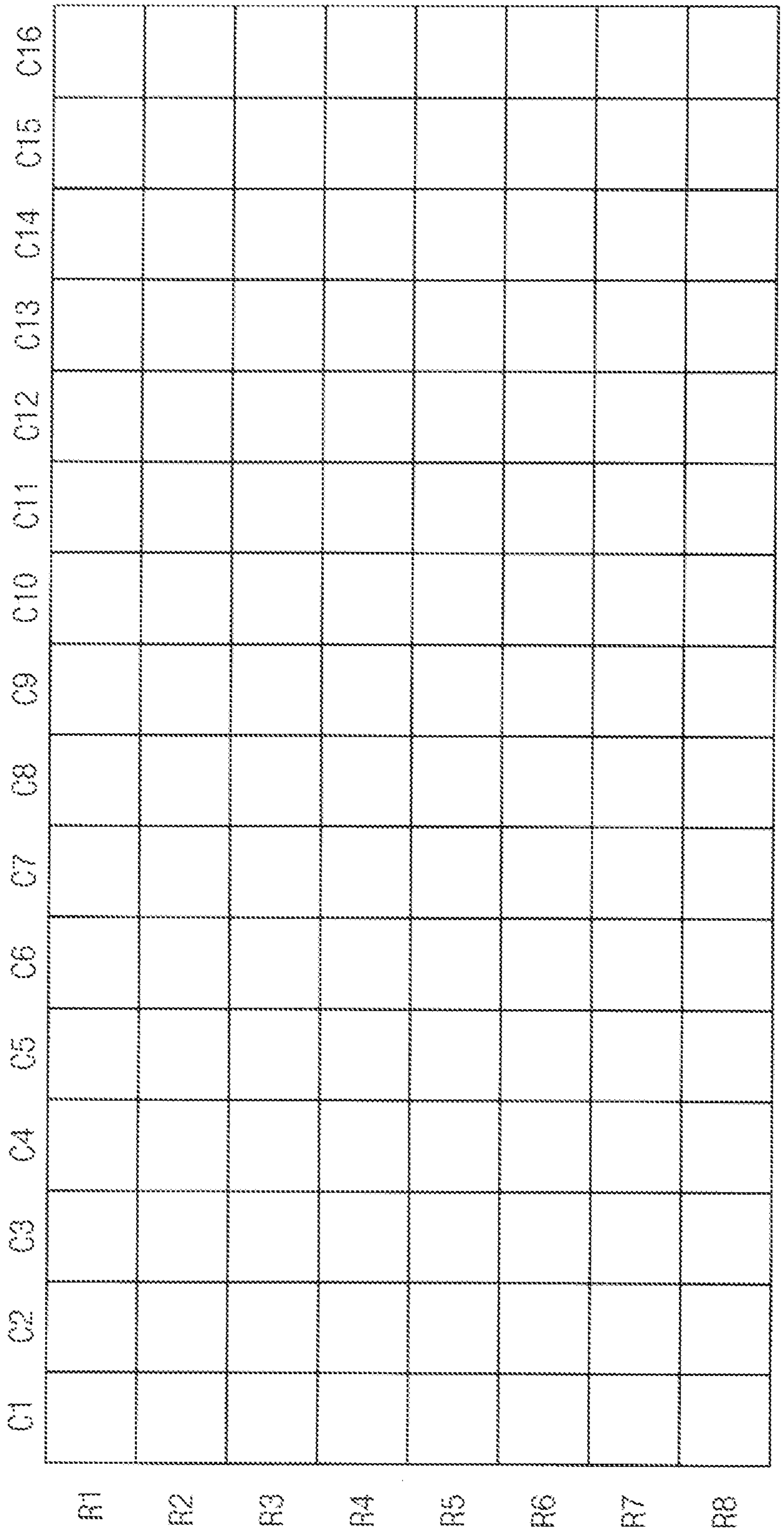

FIGS. 5 to 7 are views showing embodiments in which a display panel included in the display device of FIG. 1 is divided.

Referring to FIGS. 1, 5, 6, and 7, the driving controller 200 may calculate the load and/or the motion by dividing the display panel 100 into a plurality of regions. For example, as shown in FIG. 5, the driving controller 200 may calculate the load and/or the motion by dividing the display panel 100 into one row R1 and 16 columns C1 to C16. Alternatively, as shown in FIG. 6, the driving controller 200 may calculate the load and/or the motion by dividing the display panel 100 into one row R1 and eight columns C1 to C8. Alternatively, as shown in FIG. 7, the driving controller 200 may calculate the load and/or the motion by dividing the display panel 100 into eight rows R1 to R8 and 16 columns C1 to C16. As described above, the driving controller 200 may calculate the load and/or the motion by dividing the display panel 100 into various regions. FIGS. 5 to 7 exemplarily show schemes for dividing the display panel 100, and the driving controller 200 may calculate the load and/or the motion by dividing the display panel 100 in various schemes other than the above schemes.

Figure 8A:
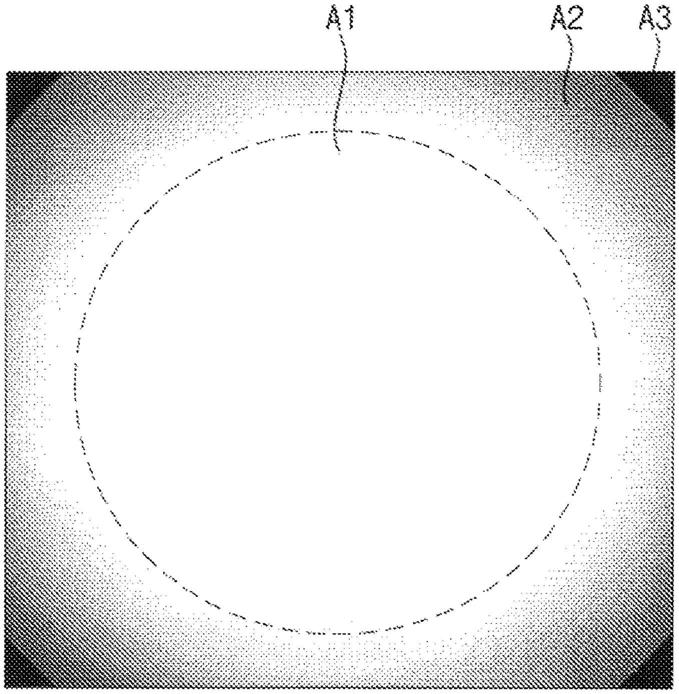
FIGS. 8A and 8B are views conceptually showing states in which the gain is applied to the display device of FIG. 1.
Figure 8B:
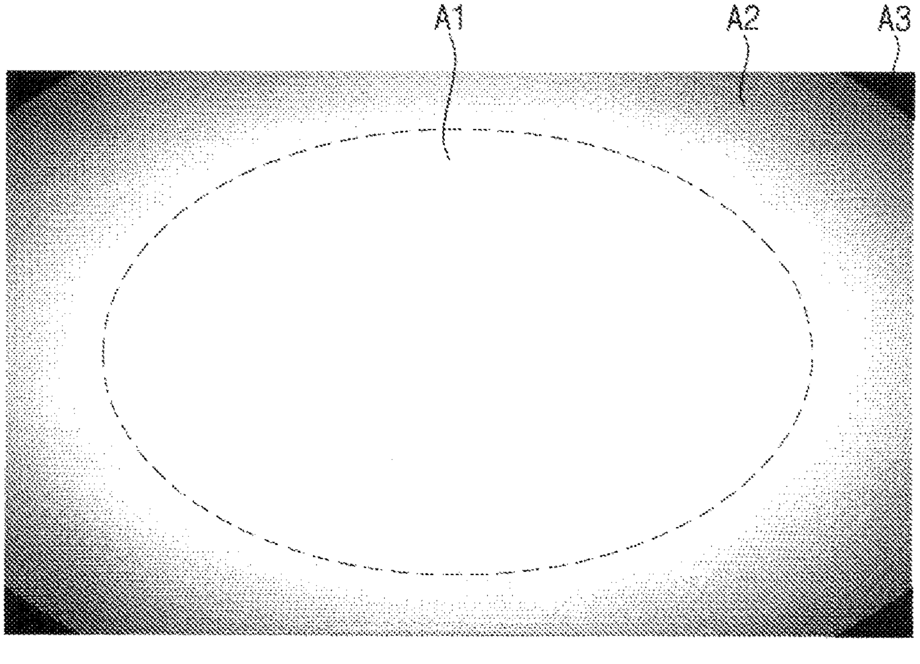
Figure 9:
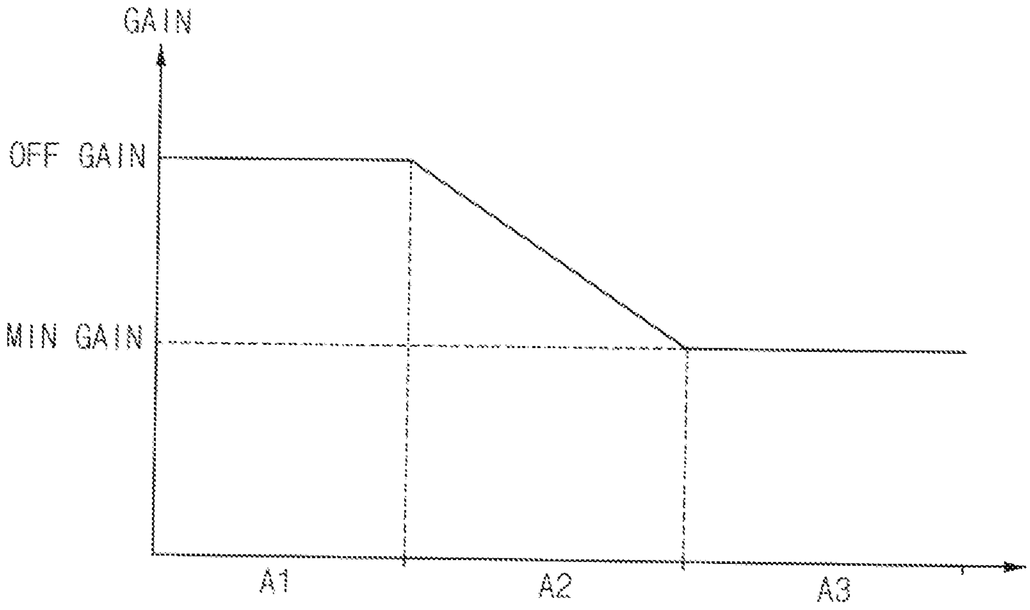
FIG. 9 is a view showing a gain applied for each region of the display panel included in the display device of FIG. 1.

FIGS. 8A and 8B are views conceptually showing states in which the gain is applied to the display device of FIG. 1, and FIG. 9 is a view showing a gain applied for each region of the display panel included in the display device of FIG. 1.

Referring to FIGS. 1, 8A, and 9, the gain may have a first gain value in a first region A1 corresponding to the central region of the display panel 100. The driving controller 200 may apply the first gain value (e.g., the off-gain value) to first input image data (or first partial input image data) input to the first region A1. In this case, a load of the first region A1 may be maintained. In other words, the load of the first region A1 of the display panel 100 may not be reduced even when the gain is applied. Therefore, the load of the first region A1 may not be reduced even when the gain is applied.

The gain may have a third gain value that is lower than the first gain value in a third region A3 corresponding to the outer peripheral region. The driving controller 200 may apply the third gain value (e.g., the minimum gain value) to third input image data (or third partial input image data) input to the third region A3 so as to reduce a load of the third region A3. The gain may have a second gain value that is gradually decreased in a second region A2 between the first region A1 and the third region A3. The driving controller 200 may apply the second gain value to second input image data (or second partial input image data) input to the second region A2 so as to reduce a load of the second region A2. Accordingly, the second region A2 of the display panel 100 may be gradually darkened toward the outer peripheral region. In other words, when the gain is applied to the display panel 100, the load of the display panel 100 may be reduced from the first region A1 to the third region A3. Accordingly, an afterimage caused by a logo or the like displayed in the third region A3 of the display panel 100 may not be visually recognized. This may also be applied substantially the same to the gain applied to the display panel 100 that will be described below.

The gain may be variously set. As shown in FIG. 8A, when the gain is applied to form the gain reduction region, a portion (the first region A1) except for the gain reduction region (the second and third regions A2 and A3) appearing on the display panel 100 may be set to have a circular shape. Alternatively, as shown in FIG. 8B, when the gain is applied to form the gain reduction region, the gain may have an elliptical shape in the first region A1. However, since the above configuration has been provided for illustrative purposes, there may be various schemes for setting the gain.

The driving controller 200 may determine the gain reduction region based on the load and/or the motion of the display panel 100. The gain reduction region may be defined as regions that are gradually darkened from a bright region of the central region. The driving controller 200 may correct a gray level of input image data corresponding to the gain reduction region. In this case, the driving controller 200 may correct the gray level of the input image data by applying the gain to the input image data.

Figure 10:
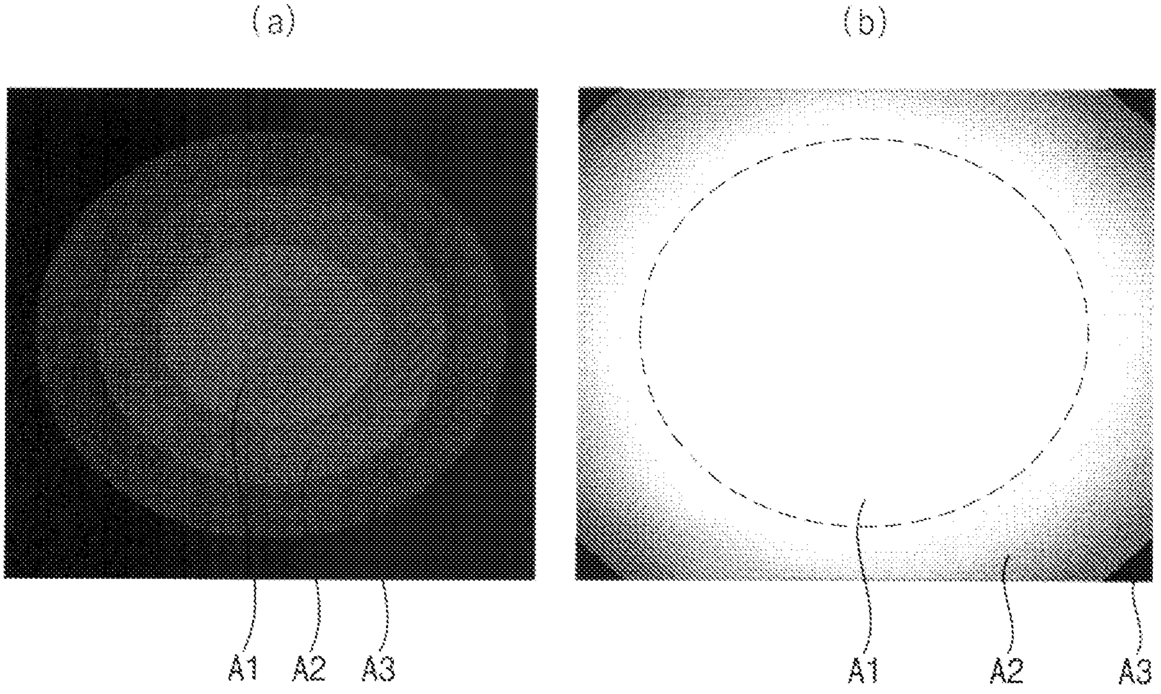
FIG. 10 is a view conceptually showing a state in which the gain is applied to the display device of FIG. 1.

FIG. 10 is a view conceptually showing a state in which the gain is applied to the display device of FIG. 1.

Referring to FIGS. 1 and 10, when the gain is applied at a low luminance (or a low gray level, which will be applied the same to the embodiments set forth below), a contour may be visually recognized. In FIG. 10, (a) shows that the gain is applied to the display panel 100 so that the contour is visually recognized when an image having a low luminance is displayed. On the contrary, when the gain is applied at a high luminance (or a high gray level, which will be applied the same to the embodiments set forth below), the contour may not be visually recognized. In FIG. 10, (b) shows that the contour is not visually recognized even when the gain is applied to the display panel 100 when an image having a high luminance is displayed. Therefore, it may be desirable that the driving controller 200 does not apply the gain (or apply a gain having a value of 1) when the load of the display panel 100 is less than or equal to a preset value. The preset value may be set by various criteria. According to one embodiment, the preset value may be set by multiplying a maximum load of the display panel 100 by a predetermined percentage. For example, the preset value may represent 30% of the maximum load. Alternatively, the preset value may represent 40% of the maximum load. In addition, the preset size may be set as various numerical values.

In some embodiments, the load may be set based on a sum of the load of the entire region of the display panel 100. Alternatively, in some embodiments, the load may be set based on loads of m blocks among total n blocks obtained by dividing the display panel 100 into the n blocks. For another example, the load may be set based on a sum of the loads of the m blocks or a representative value of the loads of the m blocks. Examples of the representative value of the load include an average luminance (average luminance in a block), an average load (a sum of the input image data), a representative value of each of the blocks (an average of the input image data), and the like. Alternatively, the load may be set as a median value of the m blocks. In this case, n is a natural number that is greater than or equal to 2, and m is a natural number that is less than n. For example, the m blocks may represent first to m-th blocks selected among the n blocks in an ascending order of an average luminance or an average load for each block. Alternatively, the m blocks may be first to m-th blocks selected among the n blocks in an ascending order of a representative value for each block. In another embodiment the m blocks may be selected according to various criteria.

Figure 11:
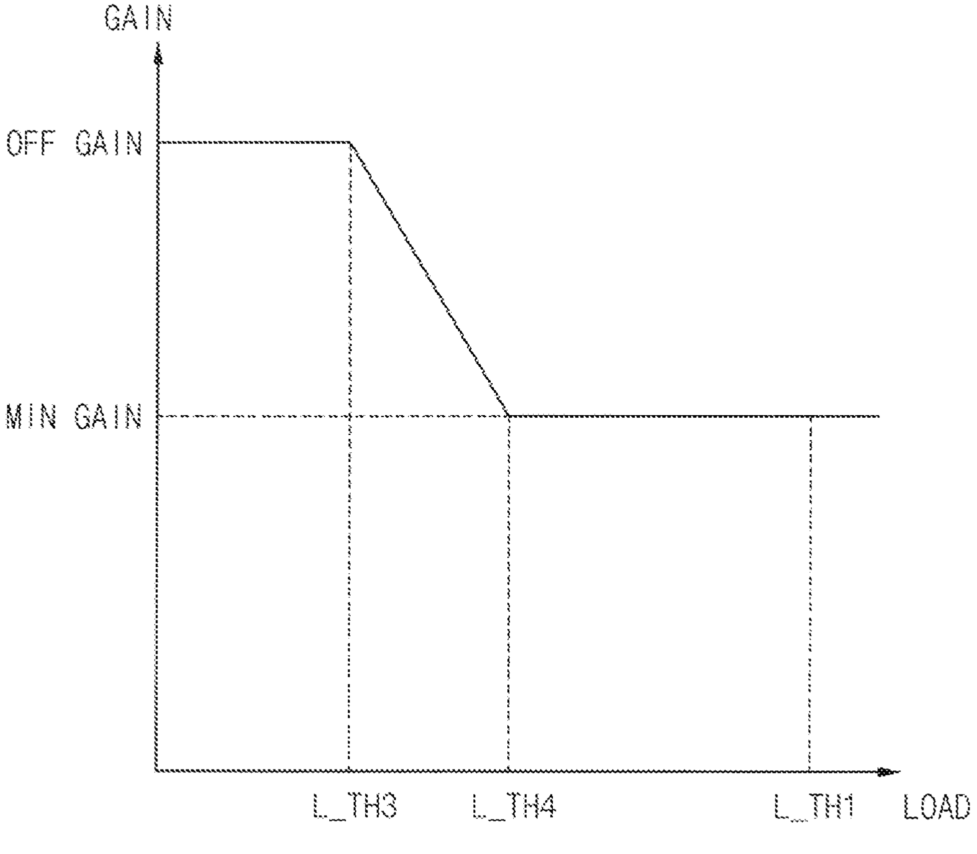
FIGS. 11 and 12 are views conceptually showing states in which the gain is applied to the display device of FIG. 1.
Figure 12:
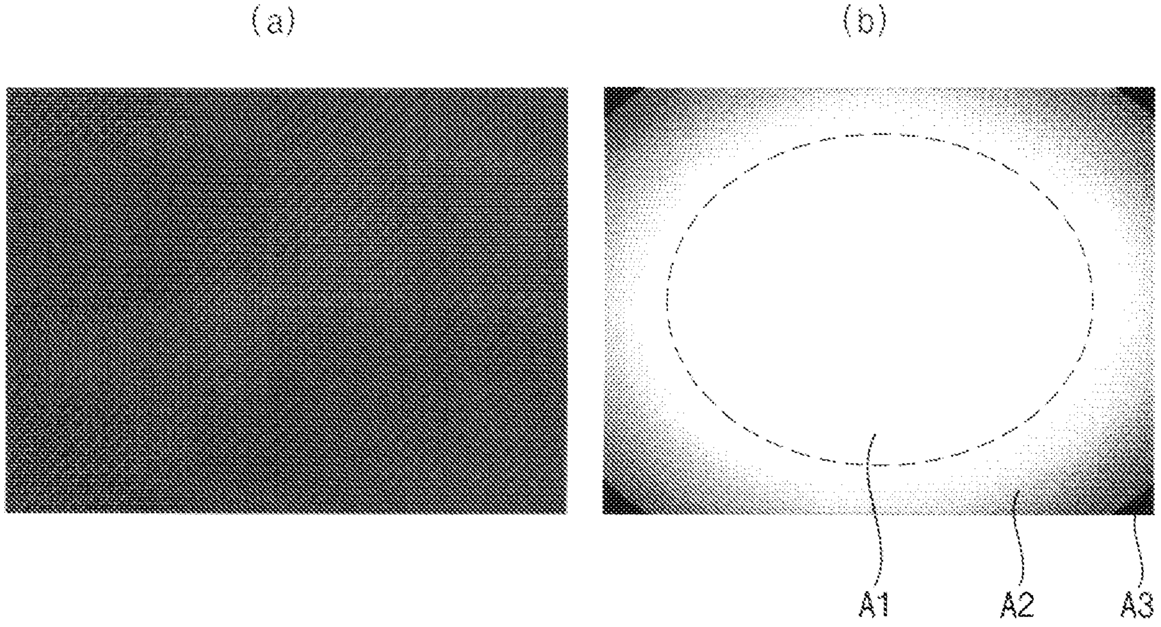

FIGS. 11 and 12 are views conceptually showing states in which the gain is applied to the display device of FIG. 1.

Referring to FIGS. 1, 11, and 12, when a value of the load input to the display panel 100 is less than or equal to the first load threshold L_TH1, the gain may be set as the minimum gain having the minimum value. However, when the value of the load input to the display panel 100 is reduced so as to be less than or equal to a preset level (a fourth load threshold L_TH4), it may increase the minimum gain value so that the contour may not be visually recognized. Therefore, the gain value may be gradually increased as the load value decreases from the fourth load threshold L_TH4 to a third load threshold L_TH3. In addition, when the load is decreased so as to be less than or equal to the third load threshold L_TH3, the minimum gain may converge to an off-gain. The off-gain may represent 1, or may represent that no gain is applied.

Here, the first load threshold L_TH1 of FIG. 11 corresponds to the first load threshold L_TH1 of FIG. 4. Each of the third load threshold L_TH3 and the fourth load threshold L_TH4 is smaller than the second load threshold L_TH2.

That is, when the value of the load of the display panel 100 is less than or equal to a preset value, the driving controller 200 may not apply the gain. In other words, when the load input to the display panel 100 has a value that is less than a predetermined threshold, the gain may be set as the off-gain value.

In some embodiments, the load may be set based on the average luminance (the block average luminance), the average load (the sum of the input image data), or the representative value of each of the blocks (the average of the input image data) of the m blocks among the n blocks obtained by dividing the display panel 100 into the n blocks. Alternatively, the load may be set as the median value of the m blocks. In this case, n is a natural number that is greater than or equal to 2, and m is a natural number that is less than n. The m blocks may represent the first to m-th blocks selected among the n blocks in the ascending order of the average luminance or the average load for each block. Alternatively, the m blocks may be first to m-th blocks selected among the n blocks in the ascending order of the representative value for each block. In another embodiment, the m blocks may be selected according to various criteria.

In some embodiments, the load may be determined based on a region having a minimum load among a plurality of regions of the display panel 100. For example, in a case where the display panel 100 is divided into 16 columns, and a sum of a load or a representative value of a load in a darkest region among the 16 columns is less than or equal to a preset value, when the gain is applied to the darkest region, the contour may be visually recognized from an outside. Therefore, the driving controller 200 may not apply the gain.

Alternatively, in some embodiments, the m blocks may be first to m-th blocks selected among the n blocks in a descending order of the load for each block. For example, in a case where one column among the 16 columns has a load that is greater than or equal to a predetermined value, even when the gain is applied to remaining columns, due to the load of the one column, the contour may not be visually recognized. Therefore, the driving controller 200 may apply the gain to the display panel 100.

According to the above embodiments, when the n blocks are arranged in n columns, the application may be performed based on blocks selected from blocks corresponding to even-numbered columns or blocks corresponding to odd-numbered columns. In this case, it may be unnecessary to perform determination for all the columns. Therefore, the driving controller 200 may be operated in a relatively simple manner.

As described above, when a gain is applied for each case according to a load, the contour may not be visually recognized even at a low luminance as shown in (a) of FIG. 12. In FIG. 12, (b) shows the display panel 100 on which an image having a high luminance is displayed.

Figure 13:
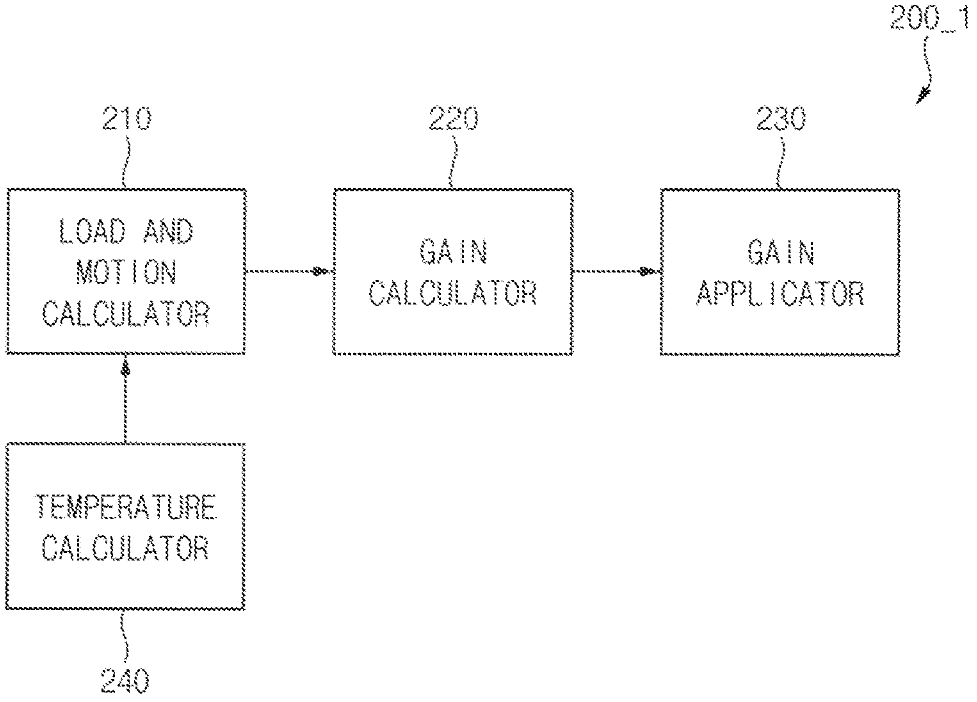
FIG. 13 is a block diagram showing another embodiment of the driving controller included in the display device of FIG. 1.
Figure 14:
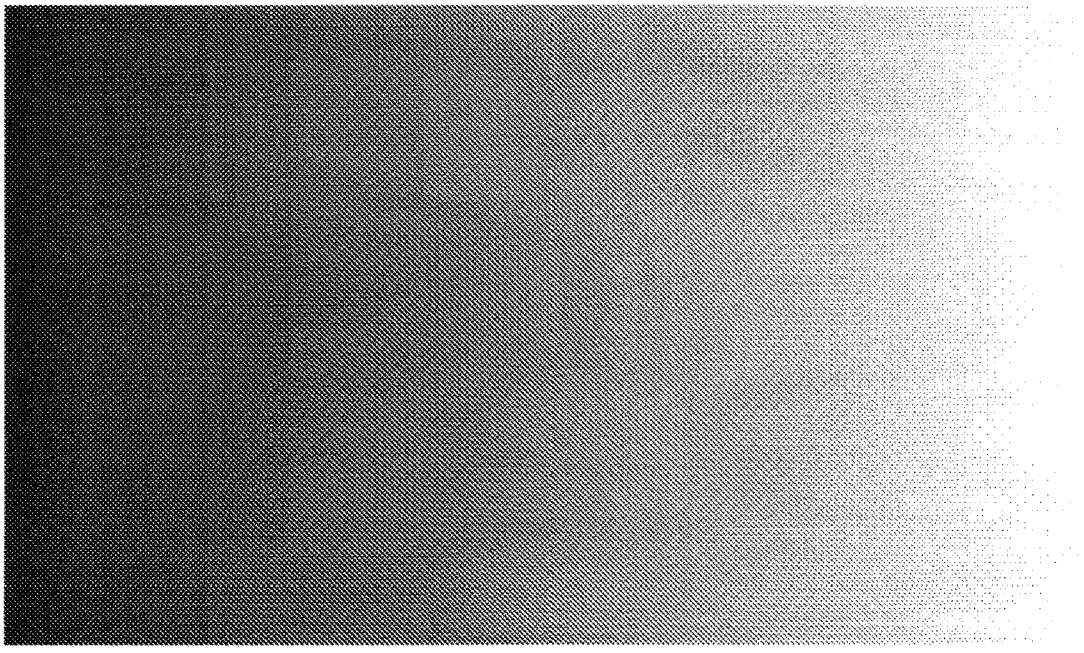
FIG. 14 is a view conceptually showing the display panel included in the display device of FIG. 1.

FIG. 13 is a block diagram showing another embodiment of the driving controller included in the display device of FIG. 1, and FIG. 14 is a view conceptually showing the display panel included in the display device of FIG. 1.

Referring to FIGS. 1, 2, 13, and 14, the driving controller 200_1 may further include a temperature calculator 240. The temperature calculator 240 may calculate a temperature of the display panel 100. In other words, a degree to which the display panel 100 is heated may be recognized.

In an embodiment, for example, when the display panel 100 displays an image that is deformed in a gradation shape along left and right sides, deterioration on the right side may be more severe than deterioration on the left side. The driving controller 200_1 may apply the gain when a temperature of the right side rises to a preset temperature or more. Accordingly, the display panel 100 may be prevented from being damaged by the deterioration.

Figure 15:
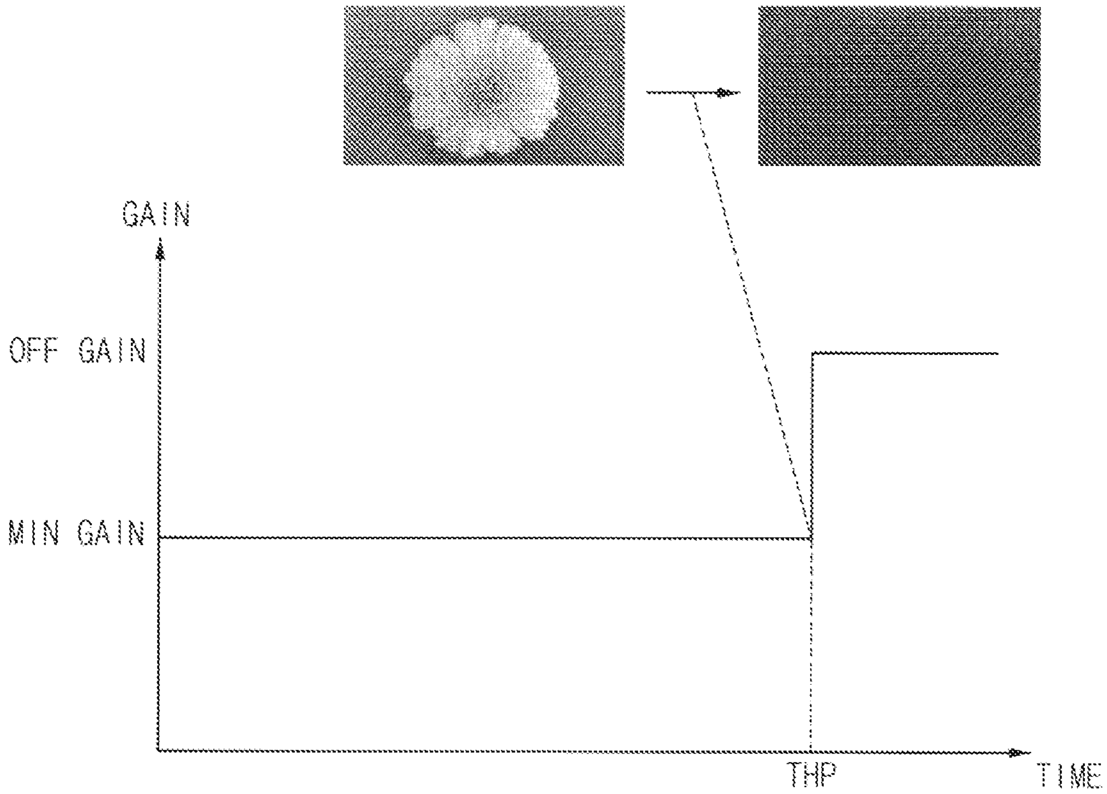
FIG. 15 is a view conceptually showing a state in which the gain is applied to the display device of FIG. 1.

FIG. 15 is a view conceptually showing a state in which the gain is applied to the display device of FIG. 1.

Referring to FIGS. 1 and 15, the load of the image displayed on the display panel 100 may be suddenly changed from a high state (see a flower picture) to a low state (see a black picture). In this case, when the gain applied to the display panel 100 in the high state of the load is applied even in the low state of the load, the contour may be visually recognized. Therefore, in order to prevent the above phenomenon, it may be desirable to immediately change the gain value to the off-gain at a point THP at which the load is sharply changed.

As used in connection with various embodiments of the disclosure, each of the load-and-motion calculator 210, the gain calculator 220, the gain applicator 230, the temperature calculator 240 and the gamma reference voltage generator 400 may be implemented in hardware, software, or firmware, for example, implemented in a form of an application-specific integrated circuit (ASIC) or a microprocessor.

Although exemplary embodiments of the present disclosure have been described above, it will be understood by those of ordinary skill in the art that various changes and modifications can be made to the present disclosure without departing from the idea and scope of the present disclosure as set forth in the appended claims.

The present disclosure may be applied to various display devices and a method of driving a display panel by using the same. For example, the present disclosure may be applied to various display devices such as display devices for vehicles, ships, and aircraft, portable communication devices, display devices for exhibition or information transmission, and medical display devices.

Although exemplary embodiments of the present disclosure have been described above, it will be understood by those of ordinary skill in the art that various changes and modifications can be made to the present disclosure without departing from the idea and scope of the present disclosure as set forth in the appended claims.

What is claimed is:

1. A display device comprising:

a display panel, which displays an image;

a driving controller, which determines a gain reduction region based on $(N-1)^{th}$ input image data input in an $(N-1)^{th}$ frame of the image displayed on the display panel and $N^{th}$ input image data input in an $N^{th}$ frame of the image displayed on the display panel, and generates a data signal by correcting the $N^{th}$ input image data by applying a gain to at least part of the $N^{th}$ input image data input in the $N^{th}$ frame corresponding to the gain reduction region, where N is a natural number that is greater than or equal to 2; and a data driver, which converts the data signal into a data voltage to output the data voltage to the display panel, wherein the data signal includes a first data signal, a second data signal, and a third data signal, wherein the driving controller is configured to:

generate the first data signal by correcting first partial input image data input to a first region of the display panel in the $N^{th}$ frame by applying a first gain value to the first partial input image data;

generate the second data signal by correcting second partial input image data input to a second region of the display panel in the $N^{th}$ frame by applying a second gain value that is lower than the first gain value to the second partial input image data; and generate the third data signal by correcting third partial input image data input to a third region of the display panel in the $N^{th}$ frame by applying a third gain value that is lower than the second gain value to the third partial input image data, wherein the $N^{th}$ input image data includes the first partial input image data, the second partial input image data, and the third partial input image data, wherein the driving controller is configured to correct the input image data by applying the gain only when a difference between a sum of input image data input to one region in the $(N-1)^{th}$ frame and a sum of input image data input to the one region in the $N^{th}$ frame is greater than or equal to a preset value, wherein the $(N-1)^{th}$ frame is a previous frame and the $N^{th}$ frame is a present frame, and wherein the first region corresponds to a central region of the display panel, the third region corresponds to an outer peripheral region of the display panel, the second region corresponds to a region between the first region and the third region, and the first, second, and third regions correspond a display part for displaying an image of the display panel.

2. The display device of claim 1, wherein the first region corresponds to a central region of the display panel, the third region corresponds to an outer peripheral region of the display panel, and the second region corresponds to a region between the first region and the third region.

3. The display device of claim 1, wherein the driving controller is configured to generate the data signal by correcting the input image data based on a sum of the at least part of the input image data, only when the sum of the at least part of the input image data is greater than or equal to a preset threshold value.

4. The display device of claim 3, wherein the driving controller is configured not to apply the gain when the sum of the at least part of the input image data is less than the preset threshold value.

5. A method of driving a display panel, the method comprising:

calculating input image data input to a display panel;

determining a gain reduction region based on the input image data;

generating a data signal by correcting the input image data by applying a gain to at least part of the input image data corresponding to the gain reduction region; and converting the data signal into a data voltage to output the data voltage to the display panel, wherein the data signal includes a first data signal, a second data signal, and a third data signal, wherein the first data signal is generated by correcting first input image data input to a first region of the display panel by applying a first gain value to the first input image data, the second data signal is generated by correcting second input image data input to a second region of the display panel by applying a second gain value that is lower than the first gain value to the second input image data, and the third data signal is generated by correcting third input image data input to a third region of the display panel by applying a third gain value that is lower than the second gain value to the third input image data, wherein the input image data includes the first input image data, the second input image data, and the third input image data, wherein the first region corresponds to a central region of the display panel, the third region corresponds to an outer peripheral region of the display panel, the second region corresponds to a region between the first region and the third region, and the first, second, and third regions correspond a display part for displaying an image of the display panel, wherein the third gain value, which is a certain value lower than 1, is applied when a load of the input image data input to the display panel is less than a first threshold, wherein the third gain value, which is 1, is applied when the load of the input image data input to the display panel is greater than a second threshold greater than the first threshold, wherein the third gain value, which is increased from the certain value to 1, is applied when the load of the input image data input to the display panel increases from the first threshold to the second threshold, wherein the gain reduction region is determined based on a difference between a sum of $(K-1)^{th}$ input image data of a $(K-1)^{th}$ frame of an image displayed on the display panel and a sum of $K^{th}$ input image data of a $K^{th}$ frame of the image displayed on the display panel, where K is a natural number that is greater than or equal to 2, and a $K^{th}$ data signal is generated by correcting the $K^{th}$ input image data by applying the gain to the $K^{th}$ input image data input in at least part of the $K^{th}$ frame corresponding to the gain reduction region.

6. A display device comprising:

a display panel, which displays an image;

a driving controller, which determines a gain reduction region based on a difference between a first load in an $(N-1)^{th}$ frame of the image displayed on the display panel and a second load in an $N^{th}$ frame of the image displayed on the display panel, and generates a data signal by correcting $N^{th}$ input image data by applying a gain to the $N^{th}$ input image data input in at least part of the $N^{th}$ frame corresponding to the gain reduction region, where N is a natural number that is greater than or equal to 2; and a data driver, which converts the data signal into a data voltage to output the data voltage to the display panel, wherein the data signal includes a first data signal, a second data signal, and a third data signal, wherein the driving controller is configured to:

generate the first data signal by correcting first partial input image data input to a first region of the display panel in the $N^{th}$ frame by applying a first gain value to the first partial input image data;

generate the second data signal by correcting second partial input image data input to a second region of the display panel in the $N^{th}$ frame by applying a second gain value that is lower than the first gain value to the second partial input image data; and generate the third data signal by correcting third partial input image data input to a third region of the display panel in the $N^{th}$ frame by applying a third gain value that is lower than the second gain value to the third partial input image data, wherein the $N^{th}$ input image data includes the first partial input image data, the second partial input image data, and the third partial input image data, wherein the driving controller is configured to correct the input image data by applying the gain only when a difference between a sum of input image data input to one region in the $(N-1)^{th}$ frame and a sum of input image data input to the one region in the $N^{th}$ frame is greater than or equal to a preset value, wherein the $(N-1)^{th}$ frame is a previous frame and the $N^{th}$ frame is a present frame, and wherein the first region corresponds to a central region of the display panel, the third region corresponds to an outer peripheral region of the display panel, the second region corresponds to a region between the first region and the third region, and the first, second, and third regions correspond a display part for displaying an image of the display panel.

* * * * *